No. 12,720. REISSUED NOV. 19, 1907.

C. T. BROWN.

TYPE WRITER.

APPLICATION FILED SEPT. 5, 1907.

Witnesses:
Chas. L. Curtis
Frederick Rieck

Inventor,
Clark Taylor Brown
by Samuel W. Balch
Attorney.

THE NORRIS PETERS CO., WASHINGTON, D. C.

UNITED STATES PATENT OFFICE.

CLARK TAYLOR BROWN, OF NEW YORK, N. Y.

TYPE-WRITER.

No. 12,720. Specification of Reissued Letters Patent. Reissued Nov. 19, 1907.

Original No. 843,997, dated February 12, 1907, Serial No. 297,554. Application for reissue filed September 5, 1907. Serial No. 391,538.

*To all whom it may concern:*

Be it known that I, CLARK TAYLOR BROWN, a citizen of the United States of America, and a resident of the borough of Brooklyn, in the city of New York, county of Kings, and State of New York, have invented certain new and useful Improvements in Type-Writers, of which the following is a specification.

My invention relates to a construction of type-bars in that class of type-writers wherein a series of type-bars are mounted to strike at a common printing point, and are guided near their heads by a guide with a flaring slot into which each type-bar strikes as it approaches the printing point.

The object of the invention is to provide means whereby, in event of a type-bar being held in the guide while a second type-bar is being operated, that the second bar will be prevented from entering the space on either side between the first type-bar and either side of the flaring slot in the guide, so as to become wedged.

Figure 1:
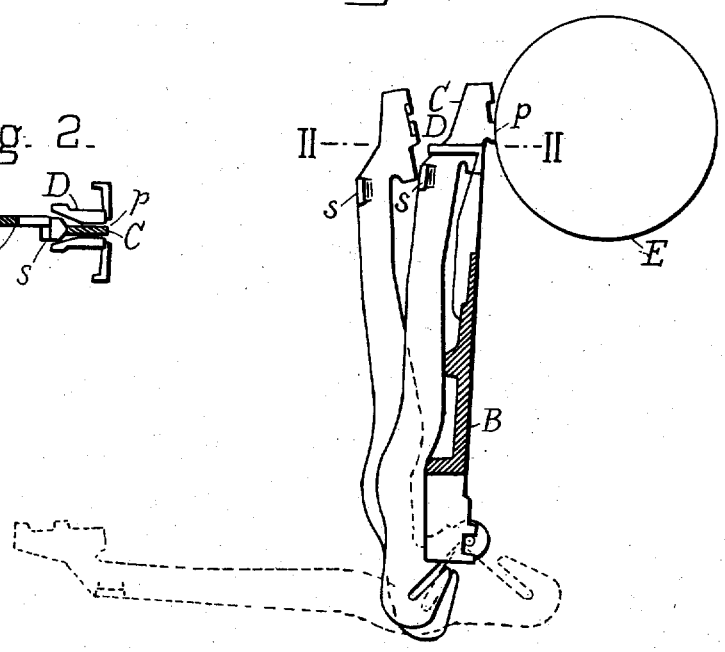
Figure 2:
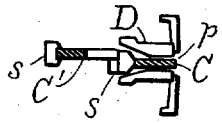

In the accompanying sheet of drawings which forms a part of my application—Figure 1 is a vertical section through the type-bar supporting segment of a type-writer, showing two type-bars, a type-bar guide and a platen constructed in accordance with my invention, and Fig. 2 is a top view of the guide at a section through two type-bars on the line II—II of Fig. 1.

My invention is illustrated in connection with a machine of the well-known Underwood type, wherein type-bars are mounted in a segment of less than a half of a circle, so as not to obstruct a view of the writing as it is written, as set forth in Re-issue Letters Patent of the United States No. 12,252, dated August 2, 1904.

A segment B which is incorporated in the framework of the type-writer affords pivotal support for all of a series of type-bars C C′, but owing to the confined pivotal space permissible for each type-bar, a guide D is supported from the segment in proximity to the printing point *p* of a platen E. The purpose of the guide is to accurately position the heads of the type-bars at the printing point. The guide has a flaring slot between the sides of which the type-bars are guided, the slot being wider at the end at which the type-bars enter than the thickness of the type-bars, and narrowing toward its other end to a width equal to the thicknesses of the type-bars at the points engaged by the guide so that each will be properly positioned by the guide at the moment of printing. This guide is necessary particularly in a machine having all the type-bars pivoted in an arc of less than half of a circle because there is insufficient space to accurately position the type-heads at the printing point by means of the pivotal supports. With such a guide and type-bars such as have been heretofore constructed, occasionally, when writing rapidly and a type-bar is in place in the guide, a second type-bar may be operated with the result, frequently, that the second type-bar is driven into the V-shaped space between the first type-bar and one side or the other of the slot in the guide, and both type-bars become so wedged that some time and effort is necessary to clear them. Possibility of such wedging is eliminated by the construction herein set forth, which consists in the provision of a broad spot *s* at a point on the back of each type-bar near its type-head where, if the type-bar is in the guide and a second type-bar is operated, the second type-bar will strike the broad spot or anvil on the first bar, and the second type-bar cannot pass between the side of the first type-bar at either side of the slot in the guide and become wedged.

It is not necessary for the function above set forth that the broad spot should be exactly opposite the guide and actually cover the wide end of the slot in the guide, but only that it should appear to do so when viewed in the direction of the shank of the type-bar when in the guide, as illustrated in Fig. 2, sufficiently to prevent the entrance of a second type-bar, and it is only necessary for the function above set forth that the face of one bar and the back of the other bar at the points of collision have the combined width which is secured in the particular embodiment illustrated by a broad spot at the back.

What I claim as new and desire to secure by Letters Patent of the United States is—

1. In a writing machine, the combination with a platen, of a guide with a flaring slot in proximity to the printing point of the platen, and a series of type-bars mounted to strike into the slot, in each of which the back and face have a combined width at a point adjacent to the head and between the head and type-bar pivot sufficient when the type-bar is in the guide to prevent the entrance and wedging of a second type-bar, substantially as described.

2. In a writing machine, the combination with a platen, of a guide with a flaring slot in proximity to the printing-point of the platen, and a series of type-bars mounted to strike into the slot, the back of each type-bar having a width at a point adjoining the head and clear of the guide sufficient when the type-bar is in the guide to prevent the entrance and wedging of a second type-bar, substantially as described.

3. In a writing machine, the combination with a platen, of a guide with a flaring slot in proximity to the printing point of the platen, and a series of type-bars mounted to strike into the slot, the back of each type-bar having a width at a point adjoining the head and between the head and type-bar pivot sufficient when the type-bar is in the guide to prevent the entrance and wedging of a second type-bar, substantially as described.

4. In a writing machine, the combination with a platen, of a guide with a flaring slot in proximity to the printing point of the platen, and a series of type-bars mounted to strike into the slot, in each of which the back and face have a combined width at a point adjacent to the head and clear of the guide sufficient when the type-bar is in the guide to prevent the entrance and wedging of a second type-bar, substantially as described.

Signed by me at New York, N. Y., this 7th day of August, 1907.

CLARK TAYLOR BROWN.

Witnesses:
SAMUEL W. BALCH,
MARIE A. CORGE.